(12) United States Patent
McCloud et al.

(10) Patent No.: US 7,733,941 B2
(45) Date of Patent: Jun. 8, 2010

(54) INTER-SYMBOL INTERFERENCE CANCELLATION FOR WIRELESS MULTIPLE ACCESS

(75) Inventors: Michael L McCloud, Boulder, CO (US); Tommy Guess, Lafayette, CO (US)

(73) Assignee: Rambus, Inc., Los Altos, CA (US)

( * ) Notice: Subject to any disclaimer, the term of this patent is extended or adjusted under 35 U.S.C. 154(b) by 905 days.

(21) Appl. No.: 11/479,401

(22) Filed: Jun. 29, 2006

(65) Prior Publication Data

US 2007/0110196 A1    May 17, 2007

Related U.S. Application Data

(60) Provisional application No. 60/736,204, filed on Nov. 15, 2005.

(51) Int. Cl.
*H04B 1/00* (2006.01)
*H04B 1/10* (2006.01)
*H04L 1/00* (2006.01)

(52) U.S. Cl. .................. 375/148; 375/144; 375/233; 375/346

(58) Field of Classification Search .................. 375/144, 375/148, 229, 230, 232, 233, 260, 267, 346
See application file for complete search history.

(56) References Cited

U.S. PATENT DOCUMENTS

| 5,761,237 | A | 6/1998 | Petersen et al. | |
|---|---|---|---|---|
| 6,535,554 | B1 * | 3/2003 | Webster et al. | 375/233 |
| 6,912,250 | B1 | 6/2005 | Adireddy et al. | |
| 7,397,843 | B2 * | 7/2008 | Grant et al. | 375/148 |
| 2004/0001537 | A1 * | 1/2004 | Zhang et al. | 375/229 |
| 2005/0111408 | A1 * | 5/2005 | Skillermark et al. | 370/331 |

* cited by examiner

*Primary Examiner*—David B Lugo
(74) *Attorney, Agent, or Firm*—Barcelo & Harrison, LLP

(57) ABSTRACT

An interference-canceling receiver is configured for cancelling inter-symbol interference due to both inter- and intra-channel interference in coded, multiple-access, spread spectrum transmissions that propagate through frequency-selective communication channels. The receiver mitigates the effects of post-cursor inter-symbol interference using feedback of previously estimated symbols, and mitigates pre-cursor inter-symbol interference using an interference canceller, such as an iterative interference canceller.

42 Claims, 9 Drawing Sheets

$$\hat{y}_{s,k,n}(t) = \sum_{j=0}^{N-1} \sum_{l=1}^{L_s} \alpha_{s,l,n-M-j} \hat{b}^{[i]}_{s,k,n-M-j} u_{s,k,n-M-j}\left(t-(j+n)T-\tau_{s,l,n-M-j}\right)$$

INTER-SYMBOL INTERFERENCE CANCELLATION FOR WIRELESS MULTIPLE ACCESS

CROSS-REFERENCE TO RELATED APPLICATIONS

This application claims priority to Provisional U.S. Pat. Appl. Ser. No. 60/736,204, filed Nov. 15, 2005, and entitled "Iterative Interference Cancellation Using Mixed Feedback Weights and Stabilizing Step Sizes," and U.S. patent application Ser. No. 11/451,688, filed Jun. 13, 2006, entitled "Iterative Interference Cancellation Using Mixed Feedback Weights and Stabilizing Step Sizes," and referred to as, which are incorporated herein by reference in their entireties.

BACKGROUND

1. Field of the Invention

The present invention relates to methods and apparatus for cancelling inter-symbol interference (ISI) in coded spread spectrum communication systems.

2. Discussion of the Related Art

In an exemplary wireless multiple-access system, a communication resource is divided into code-space subchannels, which are allocated to different users. A plurality of subchannel signals received by a wireless terminal (e.g., a subscriber unit or a base station) may correspond to different users and/or different subchannels allocated to a particular user.

If a single transmitter broadcasts different messages to different receivers, such as a base station in a wireless communication system broadcasting to a plurality of mobile terminals, the channel resource is subdivided in order to distinguish between messages intended for each mobile. Thus, each mobile terminal may decode messages in its allocated subchannel(s) from the superposition of received signals. Similarly, a base station typically separates received signals into subchannels in order to differentiate between users.

In a multipath environment, received signals are superpositions of time-delayed and complex-scaled versions of the transmitted signals. The multiplicity of time-delayed paths effectively causes the transmitted waveform to spread out in time en route to the receiver. Several types of interference can arise in multipath channels. Intra-channel interference occurs when multipath delay causes leakage between subchannels. For example, forward-link subchannels that are orthogonal at the transmitter may not be orthogonal at the receiver. Leakage due to multipath delay can also occur within a subchannel when multiple symbols are transmitted sequentially (such as in a multi-shot transmission), as the modulated waveforms for different symbol intervals overlap each other at the receiver. This leakage is known as inter-symbol interference (ISI), which is defined as spurious contributions to a received signal in a given symbol interval due to symbols transmitted during other symbol intervals. ISI can be especially significant when the delay spread of the fading is a substantial fraction of the duration of a spreading code. Inter-channel interference occurs when multiple base stations (or sectors or cells) are active so that the received signal includes unwanted contributions from arriving signals sent by other base stations.

Interference can degrade communications by causing a receiver to incorrectly decode received transmissions, thus increasing a receiver's error floor. Interference may also have other harmful effects on communications. For example, interference may diminish the capacity of a communication system, decrease the region of coverage, and/or decrease maximum data rates. For these reasons, a reduction in interference can improve reception of selected signals while addressing the aforementioned limitations due to interference.

There are many techniques for dealing with intra-channel interference and inter-channel interference (e.g., maximum likelihood and linear minimum mean-squared error), including the low-complexity iterative interference canceller (IIC) described in Provisional U.S. Pat. Appl. Ser. No. 60/736,204. Embodiments of the present invention may work in conjunction with various interference cancellers in order to cancel ISI, in addition to intra-channel and inter-channel interference.

SUMMARY OF THE INVENTION

In view of the foregoing background, embodiments of the present invention may provide a generalized interference-cancelling receiver for cancelling intra-channel, inter-channel, and inter-symbol interference in multiple-access, coded-waveform transmissions that propagate through frequency-selective communication channels. Receiver embodiments may be designed, adapted, and implemented explicitly in software or programmed hardware, or implicitly in standard RAKE-based hardware. Embodiments may be employed in user equipment on the downlink or in a base station on the uplink.

In embodiments of the invention, cancellation may be performed by a decision-feedback mechanism that mitigates post-cursor ISI (i.e., ISI caused by previously sent symbols) and an interference canceller (IC) to mitigate pre-cursor ISI (i.e., ISI caused by future symbols), intra-channel interference (i.e., the interference between users served by a common base station, sector, or cell), and inter-channel interference (i.e., interference due to users in other base stations, sectors, or cells).

An interference-cancellation system comprises a post-cursor ISI synthesis means, a post-cursor ISI cancellation means, a resolving means, an iterative interference cancellation means, and a feedback means.

The post-cursor ISI synthesis means is configured for synthesizing an estimated post-cursor ISI signal from post-cursor symbol estimates. The post-cursor ISI synthesis means may include, by way of example, but without limitation, at least one synthesizing module comprising a weighting module, a code-waveform modulator, and a channel emulator.

The weighting module is configured for weighting a plurality of symbol estimates according to symbol-estimate merits to produce weighted symbol estimates. The code-waveform modulator modulates the weighted symbol estimates onto corresponding code waveforms for producing modulated code waveforms, which are summed to generate an estimated transmit signal. The channel emulator imparts multipath delays and gains to the estimated transmit signal to produce the estimated post-cursor ISI signal.

In one embodiment, the post-cursor ISI synthesis means may include a signal processor configured to perform a matrix multiplication that employs a weighting matrix and a correlation matrix. In another embodiment, the post-cursor ISI synthesis means may include a memory for storing the post-cursor symbol estimates.

The post-cursor ISI cancellation means and the resolving means work together for processing the estimated post-cursor ISI signal and the received signal to produce a first interference-canceled signal. In one embodiment, the resolving means is configured for resolving the received signal and the estimated post-cursor ISI signal for producing a resolved received signal and a resolved estimated post-cursor ISI signal, respectively. In this embodiment, the post-cursor ISI cancellation means is configured to subtract the resolved, estimated post-cursor ISI signal from the resolved received signal to produce the first interference-canceled signal.

In an alternative embodiment, the post-cursor ISI cancellation means is configured to subtract the estimated post-cursor ISI signal from the received signal for producing an interference-cancelled signal, and the resolving means is configured for resolving the interference-canceled signal onto a signal basis for a plurality of symbol sources to produce the first interference-canceled signal.

The resolving means may include, by way of example, but without limitation, at least one despreader, such as a despreader comprising a plurality of multipliers and a plurality of integrators. The post-cursor ISI cancellation means may include, by way of example, but without limitation, a subtractive canceller.

The iterative interference cancellation means is configured for cancelling pre-cursor inter-symbol interference, intra-cell interference, and inter-cell interference from the first interference-cancelled signal to produce interference-cancelled symbol estimates and the post-cursor symbol estimates. The iterative interference cancellation means may include, by way of example, but without limitation, an iterative canceller configured to apply soft weights to symbol estimates, scale error or difference signals with a stabilizing step size, and perform mixed decisions. For example, the iterative interference cancellation means may comprise a symbol-estimation means for generating initial symbol estimates, a sequential interference cancellation means configured to provide for soft weighting, stabilizing step sizes, and mixed-decision processing, and a partitioning means configured for outputting final updated, interference-cancelled symbol estimates for an on-cursor symbol interval.

The feedback means is configured for coupling the post-cursor symbol estimates to the post-cursor ISI synthesis means. The feedback means may include, by way of example, but without limitation, any feedback mechanism (such as a feedback loop).

Embodiments of the invention may be employed in any receiver configured to support the standard offered by the $3^{rd}$-Generation Partnership Project 2 (3GPP2) consortium and embodied in a set of documents, including "TR-45.5 Physical Layer Standard for cdma2000 Spread Spectrum Systems," "C.S0005-A Upper Layer (Layer 3) Signaling Standard for cdma2000 Spread Spectrum Systems," and "C.S0024 CDMA2000 High Rate Packet Data Air Interface Specification" (i.e., the CDMA2000 standard).

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

These and other embodiments of the invention are described with respect to the figures and the following description of the preferred embodiments.

BRIEF DESCRIPTION OF THE DRAWINGS

Embodiments according to the present invention are understood with reference to the schematic block diagrams of the following figures.

DESCRIPTION OF THE PREFERRED EMBODIMENTS

Figure 1:
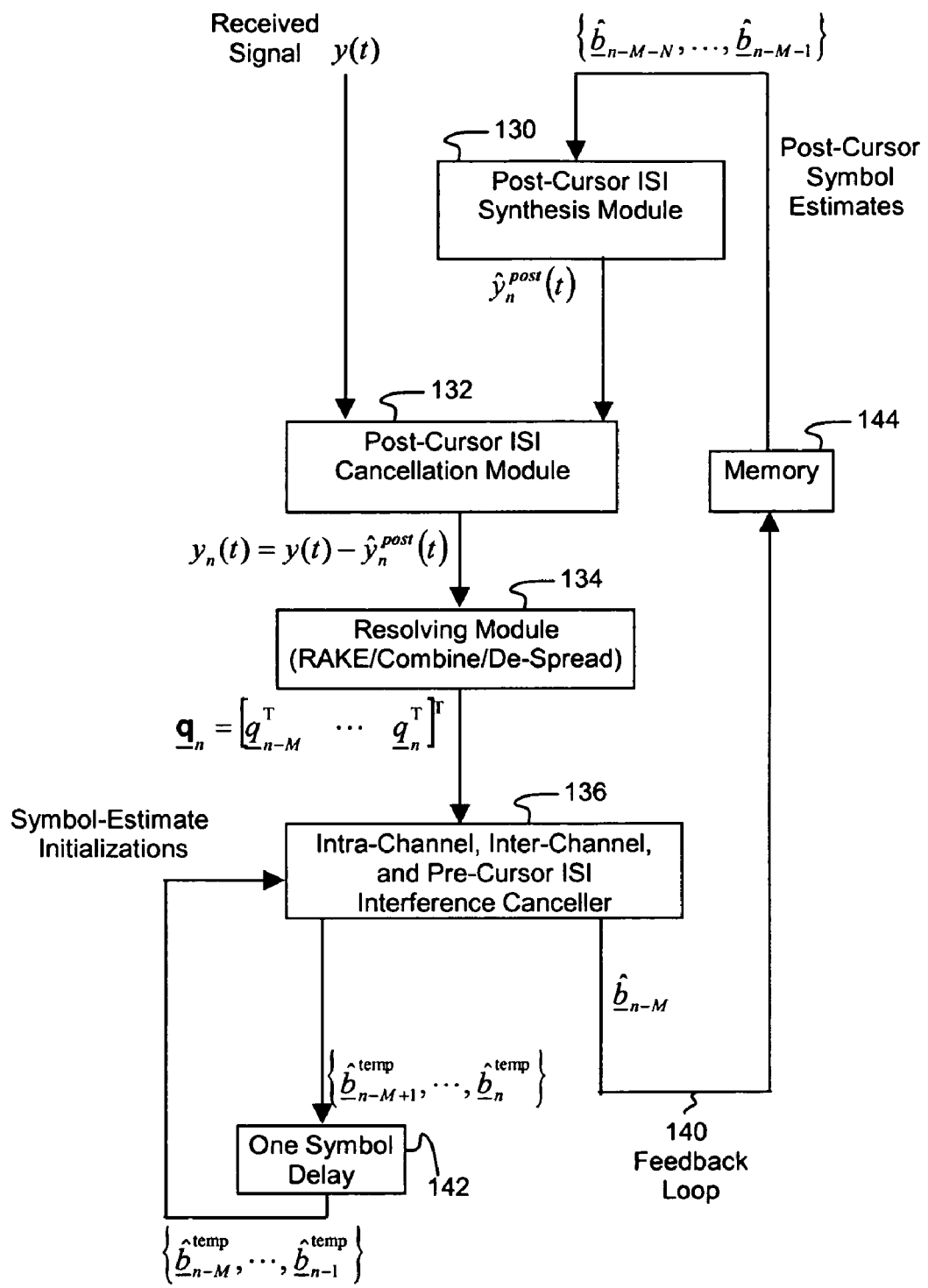
FIG. 1 is a general schematic illustrating a system configured for cancelling inter-symbol interference according to an exemplary embodiment of the invention.

In the following detailed description, reference is made to the accompanying drawings that show, by way of illustration, specific embodiments in which the invention may be practiced. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The analog baseband model of a multipath forward-link channel from multiple base stations (index s) over multiple symbol intervals (index n) is given by $$y(t) = \sum_n \sum_{s=1}^B \sum_{l=1}^{L_s} \alpha_{s,l,n} \sum_{k=1}^{K_s} b_{s,k,n} u_{s,k,n}(t - nT - \tau_{s,l,n}) + z(t) \quad \text{Equation 1}$$

with the following definitions:

B is the number of base stations (or cells or sectors);

$L_s$ is the is number of resolved paths (or fingers) from the $s^{th}$ base station;

$\alpha_{s,l,n}$ and $\tau_{s,l,n}$ are, respectively, the complex gain and delay associated with the $l^{th}$ path of base station s for the $n^{th}$ symbol interval;

$K_s$ is the number of subchannels active in the $s^{th}$ base station;

T is the length of a symbol interval;

$u_{s,k,n}(t)$ for $t \in (0,T)$ and $b_{s,k,n}$ are, respectively, the modulation waveform (e.g., Walsh code with a base-station specific PN cover) and complex symbol transmitted by the $k^{th}$ subchannel of the $s^{th}$ base station for the $n^{th}$ symbol;

z(t) is zero-mean complex additive noise that includes thermal noise and any interference from unmodeled base stations or multipath fingers.

Unmodeled base stations represent possible interference sources for which no interference cancellation will be attempted, whereas any subchannels in modeled base stations 1 to B are valid candidates for interference cancellation. Base-station vectors of path gains and symbols for the $n^{th}$ symbol are defined by $$\underline{\alpha}_{s,n} = [\alpha_{s,1,n} \quad \alpha_{s,2,n} \quad \cdots \quad \alpha_{s,L_s,n}]^T$$

$$\underline{b}_{s,n} = [b_{s,1,n} \quad b_{s,2,n} \quad \cdots \quad b_{s,K_s,n}]^T,$$

where the superscript T denotes the transpose operator, and the concatenated vector of all base station symbols during the $n^{th}$ symbol interval is given by $$\underline{b}_n = [(\underline{b}_{1,n})^T (\underline{b}_{2,n})^T \ldots (\underline{b}_{B,n})^T]^T.$$

The Euclidean norm of vectors is denoted by the notation $\|\bullet\|$, which denotes the square root of the sum of the elements' square magnitudes.

For a given symbol interval, referred to as the cursor, the ISI signal can be split into a first part that depends on symbols transmitted after the cursor and a second part that depends on symbols transmitted before the cursor. A pre-cursor ISI symbol affects symbols sent previous to it, and a post-cursor ISI symbol affects symbols sent subsequent to it.

Embodiments of the invention may be configured to first cancel a portion of the post-cursor ISI, since it depends solely on symbols for which decisions have already been made. Post-cursor ISI cancellation may be followed by cancelling a portion of the intra-channel interference, inter-channel interference, and pre-cursor ISI (which depends on symbols for which final decisions are not yet available).

In one embodiment, the cursor is placed M symbol intervals before the current symbol interval n (i.e., the cursor is at n−M). The amount of post-cursor ISI that is canceled is expressed by a whole number N. More specifically, the symbol decisions from the symbol intervals n−M−N to n−M−1 are used to estimate the post-cursor ISI that affects the cursor symbol n−M. As the value of N increases toward the maximum channel delay-spread (in units of symbols), the degree of post-cursor ISI cancellation increases, but so does the memory required. After cancelling post-cursor ISI, pre-cursor ISI and accompanying intra-channel and inter-channel interference may be addressed. This is accomplished by jointly processing an M-symbol window over the symbol intervals n−M to n. Thus, at symbol interval n, the final symbol decisions for the on-cursor symbols (i.e., those transmitted during the $(n-M)^{th}$ symbol interval) are returned. Larger values of M can improve pre-cursor ISI mitigation, but also result in greater delay and algorithmic complexity.

FIG. 1 illustrates an interference canceller configured for cancelling inter-symbol interference according to an exemplary embodiment of the invention. A post-cursor ISI synthesis module is configured for synthesizing an estimated post-cursor ISI signal from post-cursor symbol estimates stored in a memory 144. A post-cursor ISI cancellation module 132 is configured for subtracting the synthesized post-cursor ISI signal from the received signal to produce an interference-cancelled signal that is processed by a resolving module 134 configured to perform RAKE processing, combining, and despreading over multiple symbol intervals to produce a despread signal $q_n$.

Figure 2:
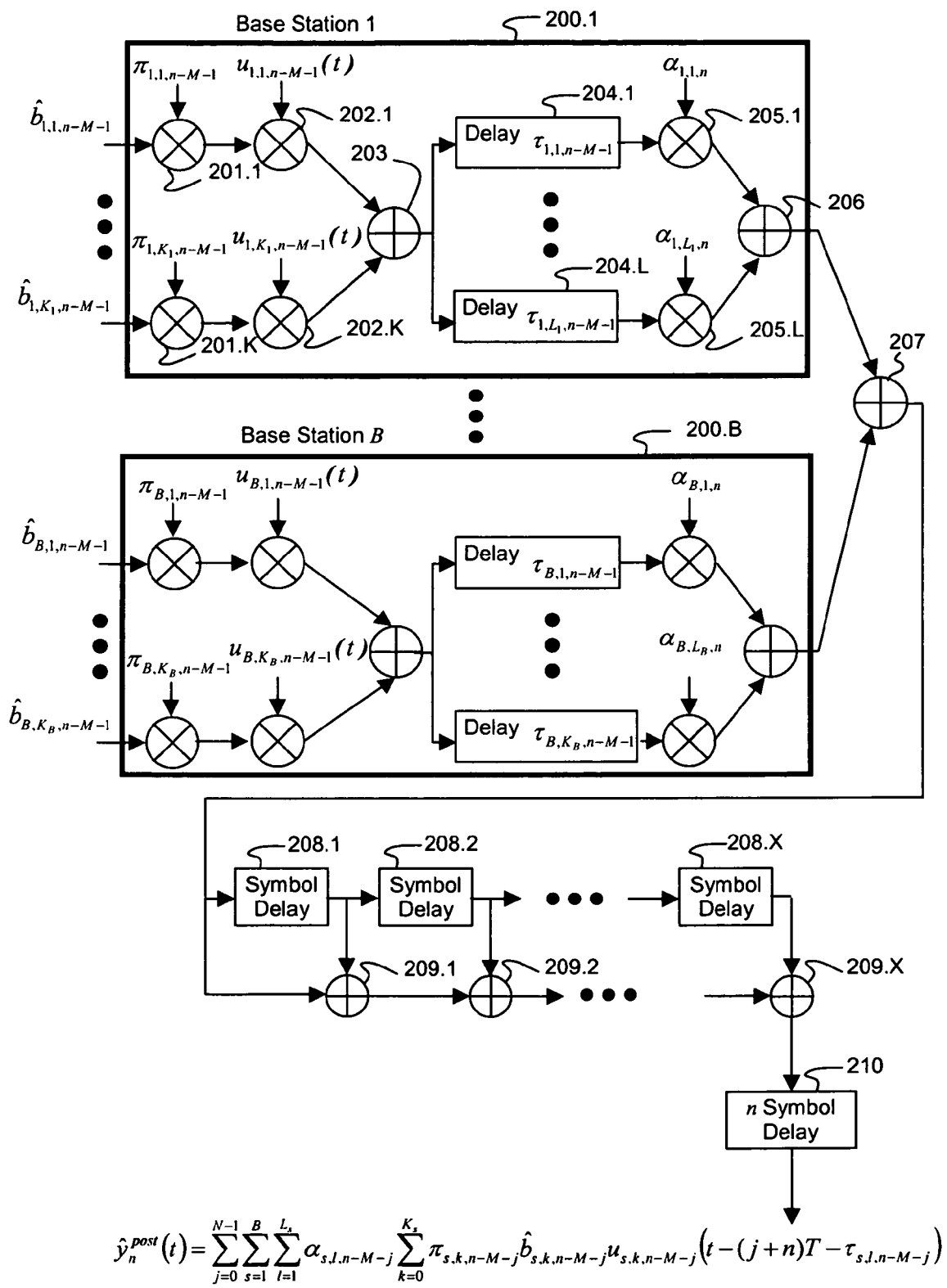
FIG. 2 illustrates an exemplary embodiment of the invention configured for synthesizing an estimate of the post-cursor inter-symbol interference signal over multiple symbols.

The despread signal $q_n$ is processed in an interference cancellation module 136 configured to provide for intra-channel, inter-channel, and pre-cursor ISI interference cancellation, for producing final symbol decisions $\underline{\hat{b}}_{n-M}$ corresponding to the $(n-M)^{th}$ symbol interval, which may be stored as post-cursor symbol estimates in the memory 144 and coupled to the post-cursor ISI signal synthesis module 130 by a feedback loop 140. The cancellation module 136 may optionally produce temporary symbol decisions $\{\underline{\hat{b}}_{n-M+1}^{temp}, \ldots, \underline{\hat{b}}_n^{temp}\}$, which may be processed by a one-symbol-delay module 142 before being returned to the cancellation module 136 as symbol-estimate initializations. The temporary symbol decisions may or may not be required during the subsequent symbol interval, depending upon the type of interference cancellation employed. FIG. 2 shows an apparatus for synthesizing an estimate of the post-cursor ISI signal during an $n^{th}$ symbol interval in accordance with the synthesis module 130 shown in FIG. 1. Final symbol estimates $\hat{b}_{s,k,n-M-i}$ for symbols sent during the symbol intervals n−M−N to n−M−1 are read from memory. The notation $\hat{b}_{s,k,n-M-i}$ is used to denote a symbol decision of the symbol transmitted by the $k^{th}$ subchannel of the $s^{th}$ base station during symbol interval n−M−i.

Synthesizing modules 200.1-200.B for each base station comprise weighting modules 201.1-201.K configured to scale the symbol estimates $\hat{b}_{s,k,n-M-i}$ by weighting factors based on merits of the symbol estimates. A plurality of code-waveform modulators 202.1-202.K modulate the weighted symbol estimates by their respective code waveforms and sum 203 modulated waveforms to synthesize an estimate of the transmitted signals from the base stations. The estimated transmitted signals are processed by a channel emulator comprising delay elements 204.1-204.L and channel-gain elements 205.1-205.L, which emulate the multipath channel delays and gains, respectively, to synthesize a plurality of received-signal constituents for each base station.

Received-signal constituents are summed 206 for each base station, and the resulting synthesized received signals are summed 207 across all of the base stations to yield an estimate of the signal received from the base stations during the symbol interval n−M−1. A symbol tapped delay-line with N−1 symbol delays 208.1-208.X and summers 209.1-209.X synthesizes an estimate of the signal received from the base stations during symbol intervals n−M−1 to n−M−N. This signal is delayed 210 by n symbol intervals to give the following weighted estimate of the received signal associated with the post-cursor ISI (wherein the subscript n denotes that this signal is estimated during the $n^{th}$ symbol interval, and the superscript "post" represents that the value is an estimate of that portion of the post-cursor ISI to be cancelled)

$$\hat{y}_n^{post}(t) = \sum_{j=0}^{N-1}\sum_{s=1}^{B}\sum_{l=1}^{L_s} \alpha_{s,l,n-M-j} \sum_{k=1}^{K_s} \pi_{s,k,n-M-j} \hat{b}_{s,k,n-M-j}$$
$$u_{s,k,n-M-j}(t-(j+n)T-\tau_{s,l,n-M-j}),$$

Equation 2 where $\pi_{s,k,n-M-j}$ is the weight for the symbol estimate $\hat{b}_{s,k,n-M-j}$.

The purpose of weighting is to control the extent to which the post-cursor ISI symbol estimates are used when performing subtractive cancellation. Qualitatively, the closer the magnitude of $\pi_{s,k,n-M-j}$ is to zero, the less the current symbol estimate $\hat{b}_{s,k,n-M-j}$ is trusted and the more its role in subtractive cancellation should be tempered. Some embodiments may incorporate systems and methods described in TCOMM-0047, which is hereby incorporated by reference in its entirety. For example, the weights $\pi_{s,k,n-M-j}$ may be expressed by $$\pi_{s,k,n-M-j} = \max\left\{C_{s,k,n-M-j}, \frac{SINR_{s,k,n-M-j}}{1+SINR_{s,k,n-M-j}}\right\},$$

Equation 3 wherein $C_{s,k,n-M-j}$ is a non-negative real constant that can be used to ensure some feedback of a symbol estimate even if its SINR is small, and $SINR_{s,k,n-M-j}$ denotes the ratio of the signal power to the noise-plus-interference power associated with the post-cursor symbol estimate $\hat{b}_{s,k,n-M-j}$ Values of $SINR_{s,k,n-M-j}$ can be evaluated or estimated using techniques of statistical signal processing, including, for example, techniques based on an error-vector magnitude. Alternatively, a pilot-assisted estimate of the broadband interference-plus-noise floor, together with a user-specific estimate of the signal plus interference plus noise floor, may be used to estimate the SINR values.

In another embodiment, the weights $\pi_{s,k,n-M-j}$ may be expressed by $$\pi_{s,k,n-M-j} = \frac{\text{Re}\{E[\text{slice}(\hat{b}_{s,k,n-M-j})^* \hat{b}_{s,k,n-M-j}]\}}{E[|\hat{b}_{s,k,n-M-j}|^2]},$$

Equation 4 where Re{ } returns the real part of the argument, and the statistical expectations in the numerator and denominator can be estimated, for example, via time-series averaging. The term slice($\hat{b}_{s,k,n-M-j}^{[i]}$) represents the symbol estimate $\hat{b}_{s,k,n-M-j}$ sliced (i.e., quantized) to the nearest constellation point from which the symbol $b_{s,k,n-M-j}$ was drawn. Clearly, this approach is applicable only to symbols whose constellations are known by the receiver. For example, it is typical for the receiver to know the constellation for the symbol of interest, but it may not know the constellations of other users in the serving base station or users in other base stations.

In Equation 4, if an estimate $\hat{b}_{s,k,n-M-j}$ is a "hard-decision" estimate of $b_{s,k,n-M-j}$ (i.e., it has been quantized to the nearest constellation point), then the weight $\pi_{s,k,n-M-j}=1$, which indicates a high level of confidence in the symbol estimate. Embodiments of the invention may employ weight-calculation techniques in accordance with either or both Equation 3 and Equation 4.

An alternative embodiment of the invention may employ subset selection to force some of the weights to zero, even if Equation 3 or Equation 4 are not zero. For example symbols received from weak base stations may be scaled with zero-valued weights. In another embodiment, the same weight values may be employed for all symbols.

The cancellation module 132 of FIG. 1 subtracts the synthesized signal from the received signal to produce the first interference-cancelled signal $$y_n(t) = y(t) - \hat{y}_n^{post}(t).$$

Equation 5

Figure 3A:
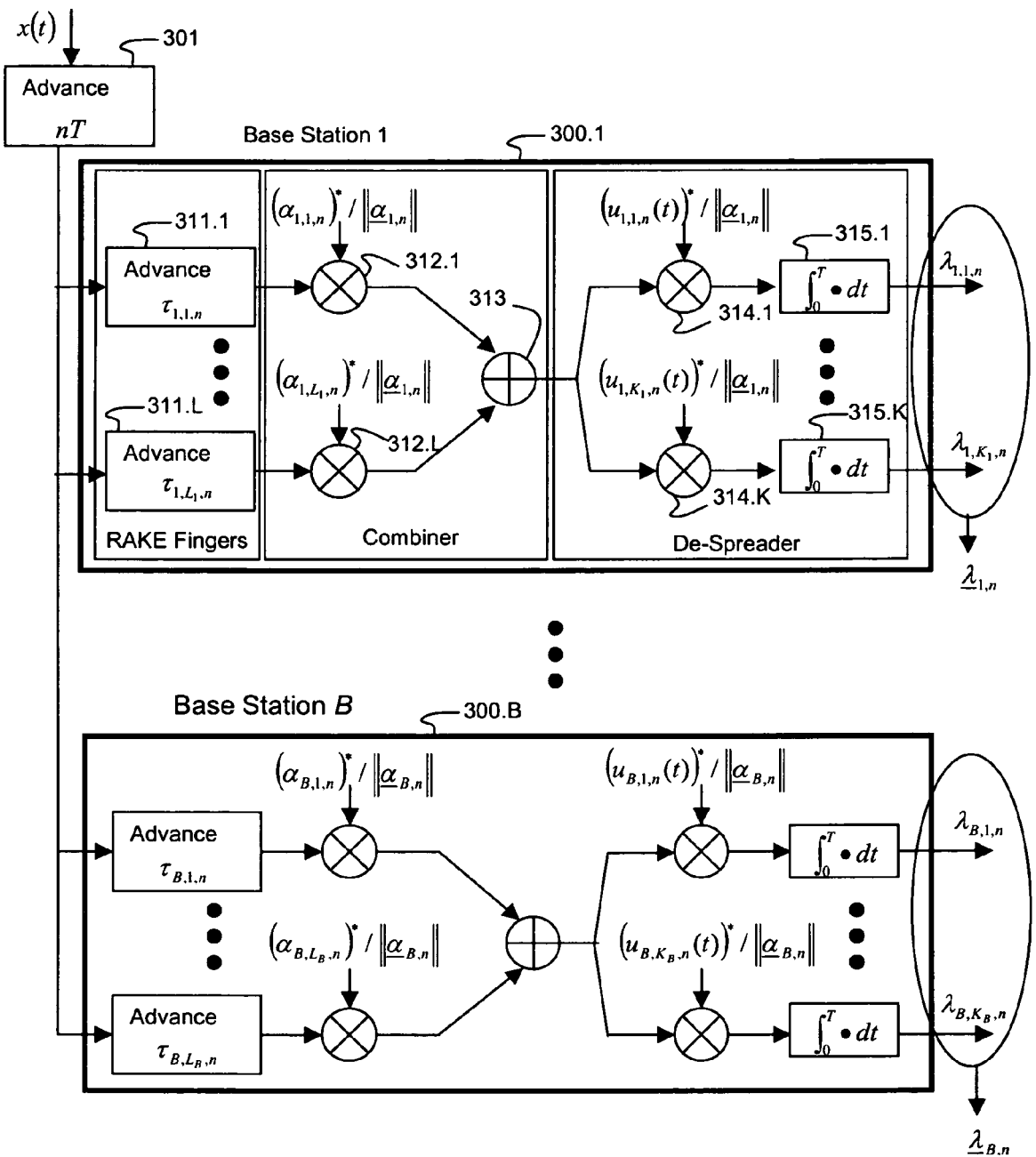
FIG. 3a illustrates an apparatus for performing RAKE/combiner/despreader processing over multiple symbol intervals.

FIG. 3 shows an exemplary embodiment of a RAKE receiver, a combiner (e.g., a maximal ratio combiner), and a despreader configured for processing the interference-cancelled signal $y_n(t)$ for all subchannels in the system within symbol intervals n−M to n. A time-advance module 301 is configured to advance an input signal $x(t)=y_n(t)$ by n symbol intervals (i.e., nT time units) in order to process the $n^{th}$ symbol interval. The time-advanced signal is input to a parallel bank of receivers 300.1-300.B, one for each base station. For a given base station, a plurality L of Rake fingers provide for advancing 311.1-311.L the input signal with respect to its multipath-channel delays and scaling 312.1-312.L the advanced signals by corresponding complex path gains. The advanced and scaled signals are summed 313 as part of a maximal ratio combining process.

Figure 3B:
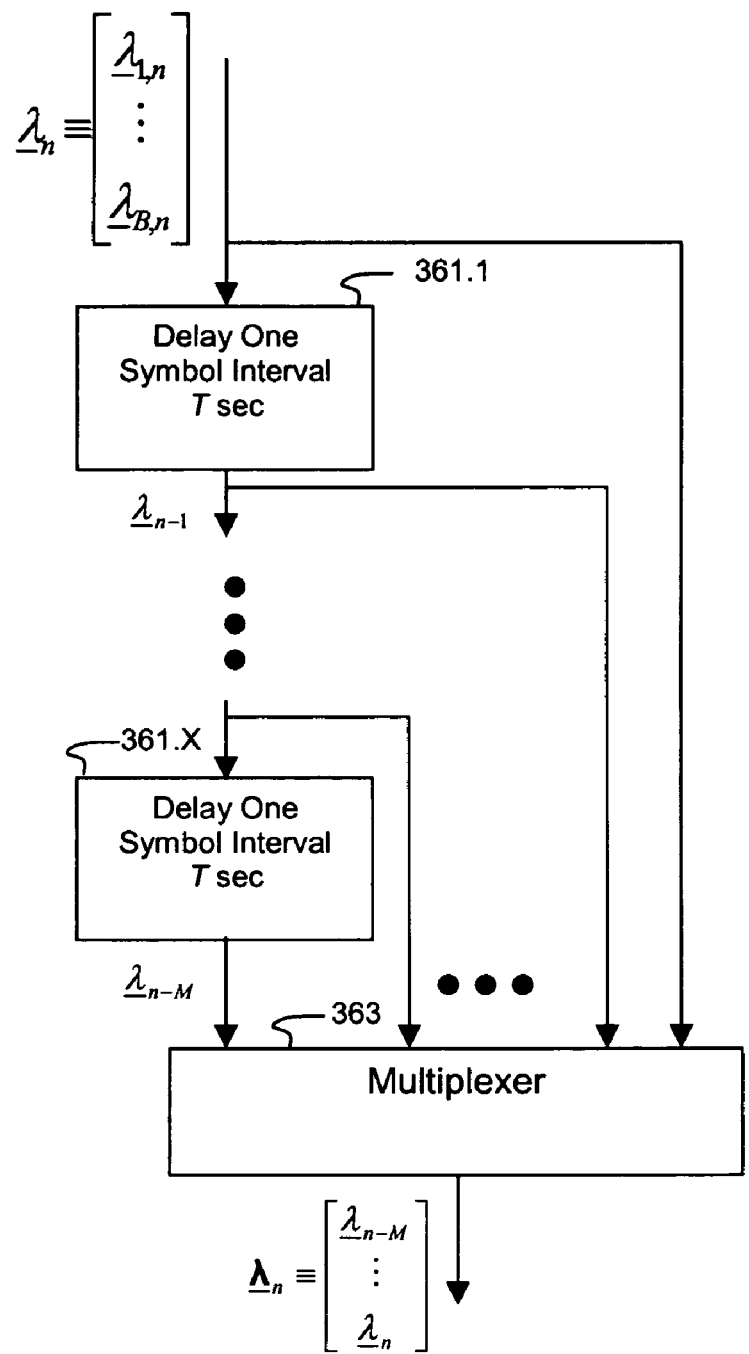
FIG. 3b illustrates an alternative apparatus configured for performing RAKE/combiner/despreader processing.

The combined signal is resolved onto the base station's subchannels with despreaders, which comprise multipliers 314.1-314.K and integrators 315.1-315.K. The $k^{th}$ output of base station s during the $n^{th}$ symbol interval is represented by the generic variable $\lambda_{s,k,n}$ in FIG. 3b. However, for the present case (i.e., since $x(t)=y_n(t)$), it is identified by $q_{s,k,n}=\lambda_{s,k,n}$. The output signals related to base station s are placed in a vector $\underline{\lambda}_{s,n} \equiv [\lambda_{s,1,n} \ldots \lambda_{s,k,n}]^T$. FIG. 3b shows a tapped delay line 361.1-361.X and a multiplexer 363 that are used to form a concatenated vector $\underline{\lambda}_n = [\underline{\lambda}_{n-M}^T \ldots \underline{\lambda}_n^T]^T$, which, in the present case, is represented by vector $$\underline{q}_n = [\underline{q}_{n-M}^T \ldots \underline{q}_n^T]^T.$$

Equation 6

This vector may also be implemented with cancellation taking place after despreading. Embodiments of the invention may employ any interference canceller (e.g., maximum likelihood or linear minimum mean-squared error) whose input is a post-cursor ISI-cancelled signal after despreading and whose outputs during the $n^{th}$ symbol interval are the final symbol estimates for those symbols transmitted during the $(n-M)^{th}$ symbol interval.

Figure 4:
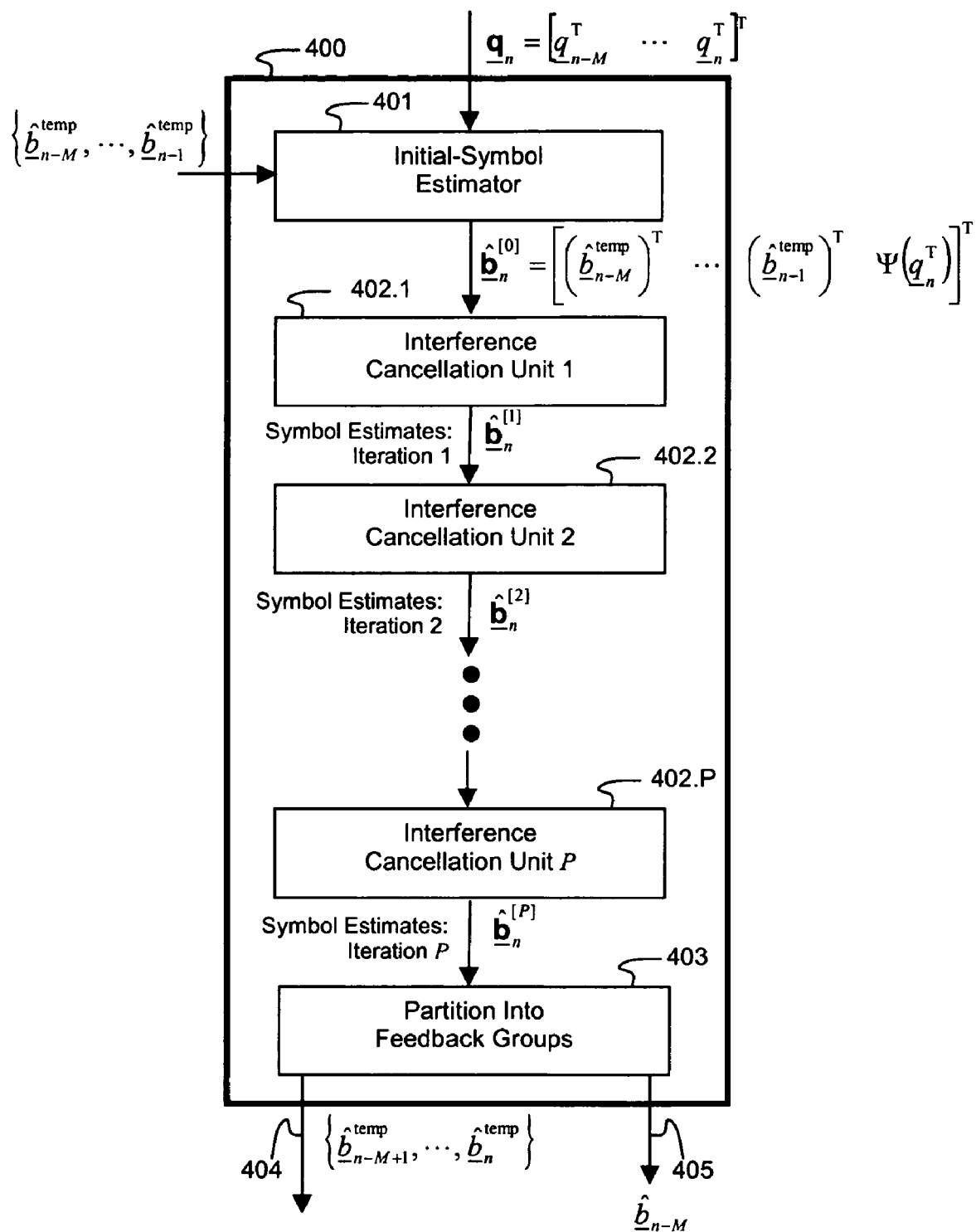
FIG. 4 illustrates an iterative interference canceller that cancels pre-cursor inter-symbol interference, inter-cell interference, and intra-cell interference.

FIG. 4 illustrates an iterative interference canceller (IIC) 400, which may resemble the canceller described in Provisional U.S. Pat. Appl. Ser. No. 60/736,204. In one embodiment, the input $\underline{q}_n$, which comprises initial soft estimates of the symbols of all subchannels for the symbol intervals n−M to n, is used to form initial symbol decisions 401 for the symbols of all subchannels. One embodiment may provide for slicing each element of $\underline{q}_n$ to form the initial symbol decisions according to $$\hat{\underline{b}}_n^{[0]} = \Psi([\underline{q}_{n-M}^T \cdots \underline{q}_{n-1}^T \ \underline{q}_n^T]^T),\qquad \text{Equation 7}$$

where the operator $\Psi(\cdot)$ makes a soft or hard symbol decision on each element of its vector argument. Such symbol estimation may be implemented as described in TCOM-0047. However, other symbol-estimation techniques may be employed An alternative embodiment may use temporary symbol decisions $\{\hat{\underline{b}}_{n-M}^{temp}, \ldots \hat{\underline{b}}_{n-1}^{temp}\}$ from a previous symbol interval. The initializing symbol decisions are contained in the vector $$\hat{\underline{b}}_n^{[0]} = \left[(\hat{\underline{b}}_{n-M}^{temp})^T \cdots (\hat{\underline{b}}_{n-1}^{temp})^T \ \Psi(\underline{q}_n^T)\right]^T. \qquad \text{Equation 8}$$

In this case, Equation 8 may provide a better starting point for the initial symbol decisions than Equation 7, as it takes advantage of the memory in the channel. These initial symbol decisions are coupled to the first of a serial chain of interference cancellation units (ICUs) 402.1-402.P, each of which produces updated symbol decisions whose pre-cursor ISI, intra-channel interference, and inter-channel interference are reduced relative to the input symbol decisions. The output of the first ICU 402.1 is denoted by $\hat{\underline{b}}_n^{[1]}$. Similarly, the second ICU 402.2 improves the input symbol decisions $\hat{\underline{b}}_n^{[1]}$ to produce $\hat{\underline{b}}_n^{[2]}$, and so on until the final ICU 402.P produces the final symbol $$\text{decisions } \hat{\underline{b}}_n^{[P]} = \left[(\hat{\underline{b}}_{n-M}^{[P]})^T \cdots (\hat{\underline{b}}_{n-1}^{[P]})^T \ (\hat{\underline{b}}_n^{[P]})^T\right]^T.$$

The final symbol decisions are partitioned 403 into two sets of outputs. A first set of outputs comprise temporary symbol decisions that are fed back in order to help form the initial inputs of the first ICU during the next symbol interval. The first set of outputs is expressed by $\hat{\underline{b}}_{n-i}^{temp} \equiv \hat{\underline{b}}_{n-i}^{[P]}$, for i=0, 1, 2, ..., M-1. The second set of outputs contains the final decisions for the symbols of the $(n-M)^{th}$ symbol interval, which are given by $\hat{\underline{b}}_{n-M} \equiv \hat{\underline{b}}_{n-M}^{[P]}$. The functional aspects of each ICU 402.1-402.P, which are described in TCOMM-0047, include soft weighting the symbol estimates, scaling with a stabilizing step size, and performing mixed-decisions (i.e., a combination of hard and soft symbol estimates).

Although the ICUs in FIG. 4 are illustrated as a serial concatenation of units, they may be employed as a single unit whose control variables are changed from iteration to iteration. Subtractive cancellation in an ICU may occur on finger signals or subchannel signals prior to despreading, or on a symbol level subsequent to despreading. The former cases require the synthesis of constituent finger or subchannel signals.

Figure 5A:
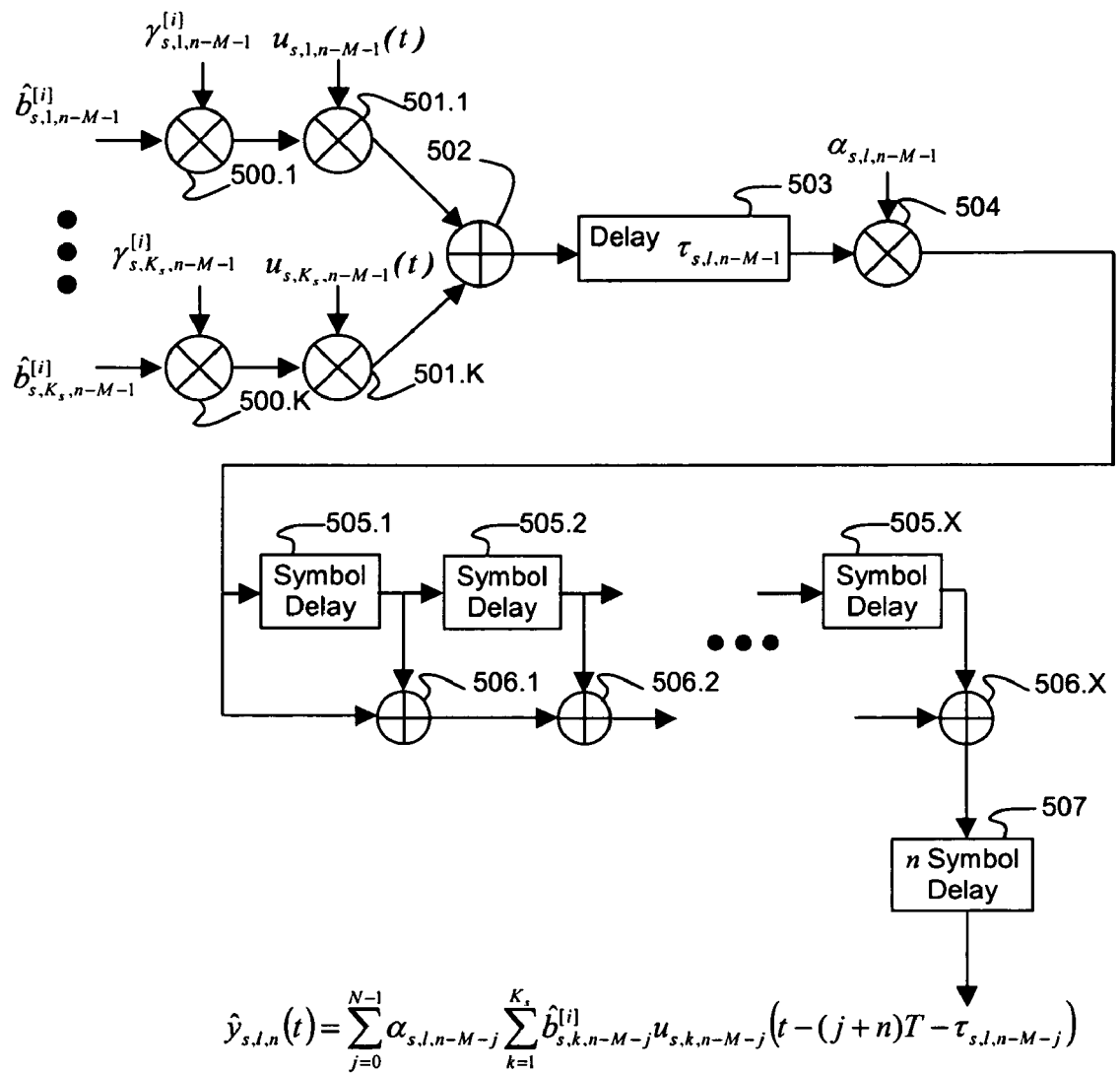
FIG. 5a shows an exemplary embodiment of the invention configured for synthesizing finger signals that may be employed in an interference canceller that performs subtractive cancellation prior to despreading.

FIG. 5a illustrates an embodiment of the invention configured for synthesizing constituent finger signals in the context of an ISI channel model. To generate a particular finger constituent, input symbol estimates are first weighted 500.1-500.K by their soft weights (denoted by coefficients γ and modulated 501.1-501.K onto corresponding code waveforms. A summer 502 combines the modulated waveforms to synthesize a transmit signal, which is delayed 503 and scaled 504 to emulate a path of the multipath channel. The resulting signal represents the contribution of a single symbol interval without any ISI. To capture the ISI, multiple overlapping symbol intervals are combined with a tapped delay line comprising delays 505.1-505.X and 507, and summers 506.1-506.X.

Figure 5B:
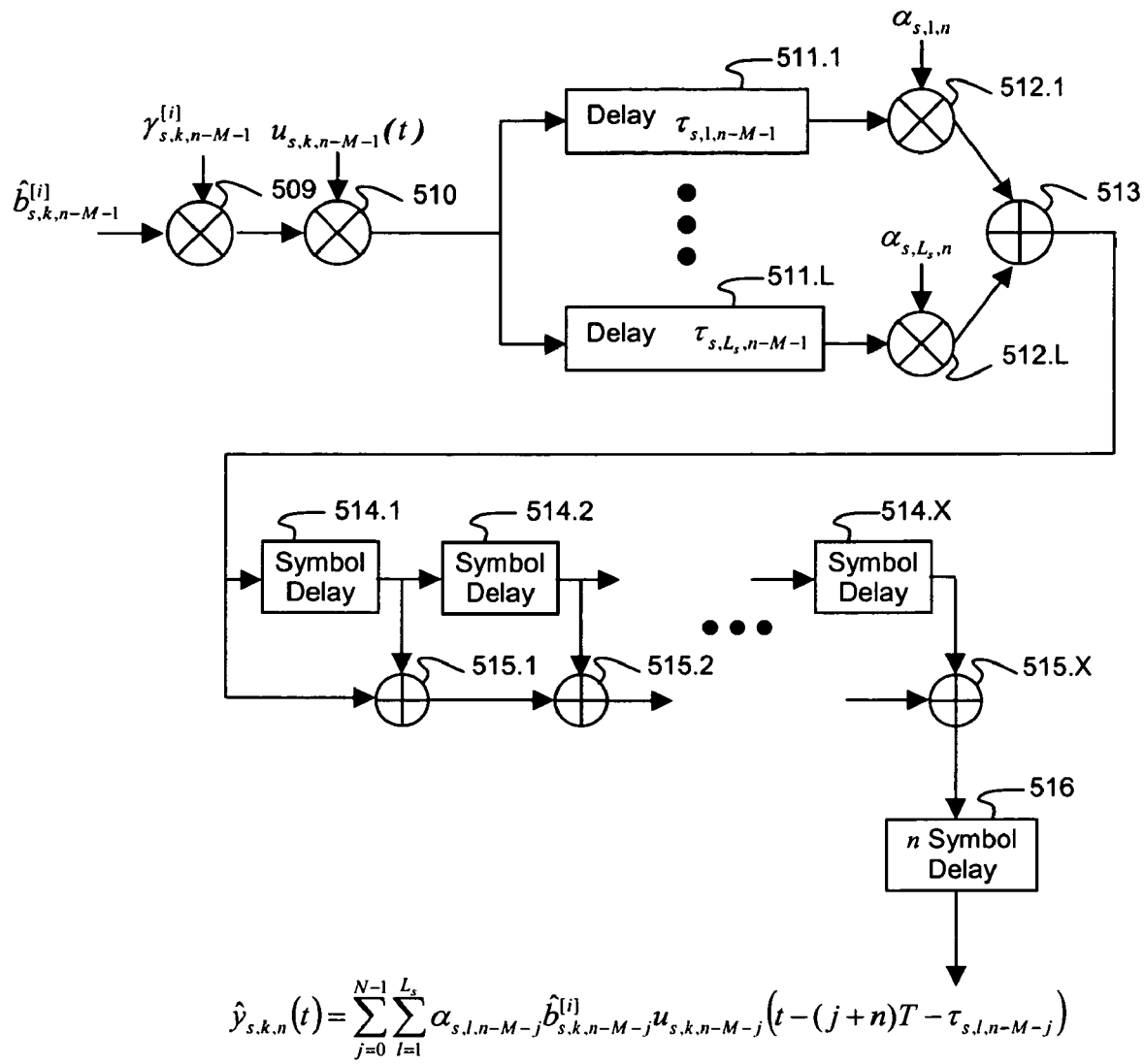
FIG. 5b shows an exemplary embodiment of the invention configured for synthesizing subchannel constituent signals in an interference canceller in accordance with an embodiment of the invention.

FIG. 5b illustrates an alternative embodiment of the invention configured for synthesizing constituent subchannel signals. A subchannel constituent is generated by scaling 509 the associated symbol estimate with its soft weight 509, and modulating 510 the weighted symbol estimate onto the subchannel's code to yield a synthesized transmit signal. This signal is processed by a multipath channel emulator comprising multipath delays 511.1-511.L and gains 512.1-512.L. These synthesized multipath components are summed 513 to a portion of the synthesized subchannel signal corresponding to a single symbol. A tapped delay line comprising delays 514.1-514.X and 516, and summers 515.1-515.X produces the ISI signal as a superposition over multiple symbol intervals.

Figure 6A:
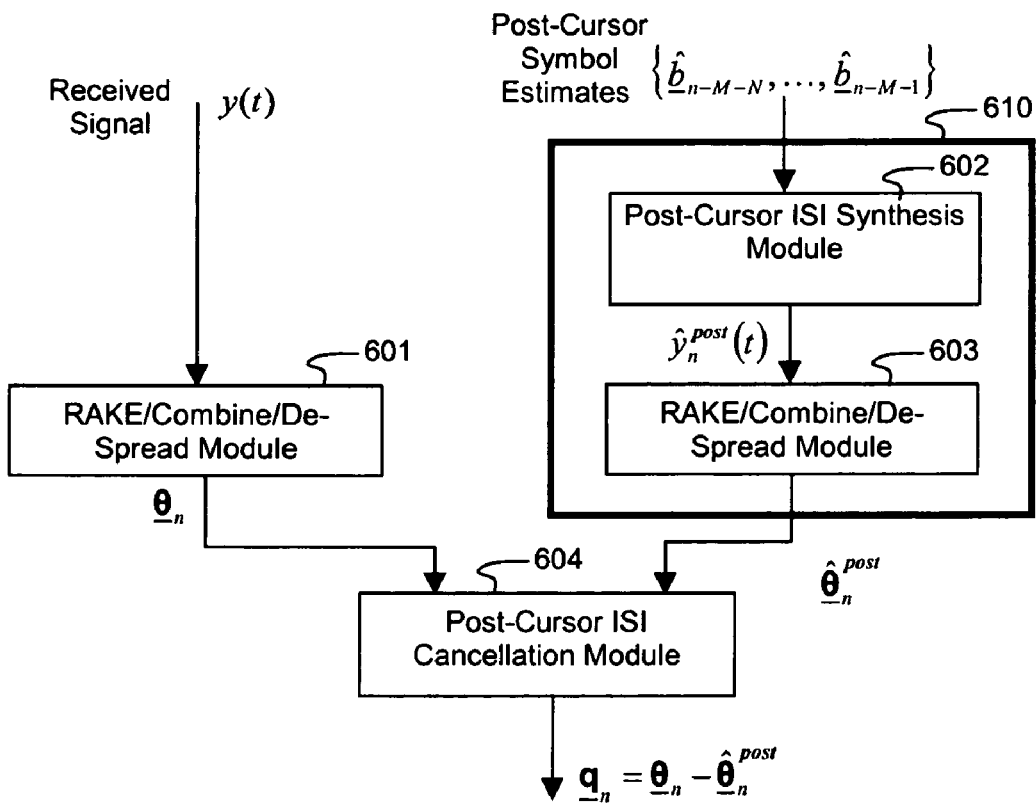
FIG. 6a illustrates a schematic block diagram of an apparatus configured to perform subtractive cancellation after despreading.

FIG. 6a illustrates an embodiment of the invention in which interference cancellation is performed after despreading. The received signal y(t) is processed by a resolving module, such as a RAKE, combining, and despreading module 601, to produce the generic output signal vector $\underline{\theta}_n$. Post-cursor symbol estimates are processed by a post-cursor ISI synthesis module 602 to produce a post-cursor ISI signal $y_n^{post}(t)$ (such as described with respect to FIG. 2), which is processed by a RAKE, combining, and despreading module 603 (such as described with respect to FIG. 3, wherein the generic input x(t) is $y_n^{post}(t)$, and the generic output $\underline{\lambda}_n$ is signal vector $\underline{\theta}_n^{post}$). A post-cursor ISI cancellation module 604 subtracts the resolved post-cursor ISI signal vector $\hat{\underline{\theta}}_n^{post}$ from the resolved received signal vector $\underline{\theta}_n$.

Figure 6B:
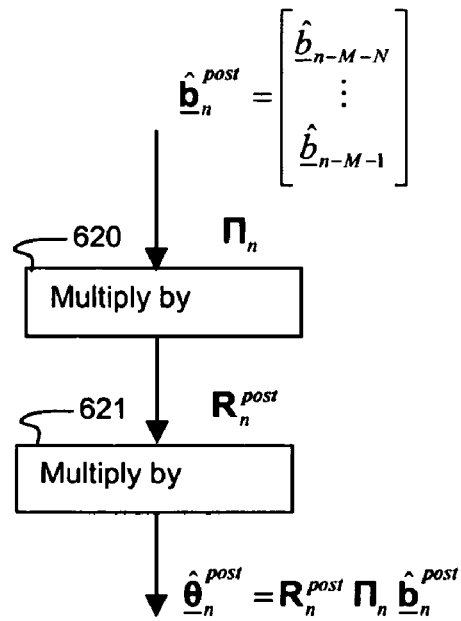
FIG. 6b illustrates a method for synthesizing a post-cursor ISI estimate and performing a Rake/combining/despreading operation.

Alternatively, the post-cursor ISI vector may be produced in a matrix-multiplication step 620 shown in FIG. 6b. In this case, the input may comprise the vector $\underline{\hat{b}}_n^{post}=[(\underline{\hat{b}}_{n-M-N})^T (\underline{\hat{b}}_{n-M-N+1})^T \ldots (\underline{\hat{b}}_{n-M-1})^T]^T$, which is pre-multiplied by the weighting matrix $\Pi_n$ 620, followed by multiplication 621 by a K×K matrix $R_n^{post}$ to yield $\hat{\underline{\theta}}_n^{post}=R_n^{post}\Pi_n\underline{\hat{b}}_n^{post}$. The weighting matrix $\Pi_n$ is a diagonal matrix whose diagonal elements are the previously defined weights of the post-cursor symbols (i.e., $\{\pi_{s,k,n-M-j}\}_{s=1,k=1,j=1}^{B,K_s,N}$).

The following expressions may be used to derive the matrix $R_n^{post}$ $$\underline{\theta}_n = \sum_m R_{nm}\underline{b}_m + \underline{z}_n, \qquad \text{Equation 9}$$

where $$R_{nm} = \begin{bmatrix} (R_{nm})_{11} & \cdots & (R_{nm})_{1B} \\ \vdots & \ddots & \vdots \\ (R_{nm})_{B1} & \cdots & (R_{nm})_{BB} \end{bmatrix}$$

is a B×B matrix of blocks, whose (s, s') block-entry is the matrix $(R_{nm})_{ss'}$;

$(R_{nm})_{ss'}$ is a $K_s \times K_{s'}$ matrix whose (j,k) element is given by $$\int_0^T \tilde{u}_{s',k,m}(t+nT)(\tilde{u}_{s,j,n}(t))^* dt, \text{ where}$$

$$\tilde{u}_{s,k,n}(t) = \sum_{l=1}^{L_s} \alpha_{s,l,n} u_{s,k,n}(t - \tau_{s,l,n})$$

is the effective received code waveform (i.e., after experiencing the multipath channel of base station s) for the $k^{th}$ sub-channel in base station s during the $n^{th}$ symbol interval.

$\underline{z}_n$ is a column vector of length $$K \equiv \sum_{s=1}^{B} K_s$$

whose elements are the result of front-end processing of the additive interference signal z(t) in the received signal y(t) in Equation 1.

Concatenating this vector for the current symbol with the vectors from the previous M symbols gives a window over which interference cancellation operates, $$\begin{bmatrix} \underline{\theta}_{n-M} \\ \vdots \\ \underline{\theta}_n \end{bmatrix} = \underbrace{\begin{bmatrix} \cdots & R_{n-M\,n-M-N-2} & R_{n-M\,n-M-N-1} \\ \vdots & \vdots & \vdots \\ \cdots & R_{n\,n-M-N-2} & R_{n\,n-M-N-1} \end{bmatrix} \begin{bmatrix} \vdots \\ \underline{b}_{n-M-N-2} \\ \underline{b}_{n-M-N-1} \end{bmatrix}}_{\text{Ignore this post-cursor ISI}} +$$

$$\underbrace{\begin{bmatrix} R_{n-M\,n-M-N} & \cdots & R_{n-M\,n-M-1} \\ \vdots & \ddots & \vdots \\ R_{n\,n-M-N} & \cdots & R_{n\,n-M-1} \end{bmatrix} \begin{bmatrix} \underline{b}_{n-M-N} \\ \vdots \\ \underline{b}_{n-M-1} \end{bmatrix}}_{\text{Cancel this post-cursor ISI}} +$$

$$\underbrace{\begin{bmatrix} R_{n-M\,n-M} & \cdots & R_{n-M\,n} \\ \vdots & \ddots & \vdots \\ R_{n\,n-M} & \cdots & R_{n\,n} \end{bmatrix} \begin{bmatrix} \underline{b}_{n-M} \\ \vdots \\ \underline{b}_n \end{bmatrix}}_{\text{Use this to estimate } \underline{b}_{n-M}} +$$

$$\underbrace{\begin{bmatrix} R_{n-M\,n+1} & R_{n-M\,n+2} & \cdots \\ \vdots & \vdots & \vdots \\ R_{n\,n+1} & R_{n\,n+2} & \cdots \end{bmatrix} \begin{bmatrix} \underline{b}_{n+1} \\ \underline{b}_{n+2} \\ \vdots \end{bmatrix}}_{\text{Ignore this pre-cursor ISI}} + \begin{bmatrix} \underline{z}_{n-M} \\ \vdots \\ \underline{z}_n \end{bmatrix}.$$

This equation, as expressed in a simplified notation (with the obvious implicit definitions of the terms), is $$\underline{\theta}_n = R_n^{post\text{-}ignore}\underline{b}_n^{post\text{-}ignore} + R_n^{post}\underline{b}_n^{post} + R_n \underline{b}_n + R_n^{pre\text{-}ignore}\underline{b}_n^{pre\text{-}ignore} + \underline{z}_n.$$

The first and fourth summands on the right-hand side are those portions of ISI for which no cancellation or mitigation is attempted and may be subsequently lumped together in the additive noise vector. The second summand on the right-hand side is estimated with weighted estimates of the symbols in $\underline{b}_n^{post}$ (these estimates are denoted by $\underline{\hat{b}}_n^{post}$); this weighted estimate is $\underline{\hat{\theta}}_n^{post} = R_n^{post}\Pi_n \underline{\hat{b}}_n^{post}$. The cancellation module 604 subtracts the weighted estimate is $\underline{\hat{\theta}}_n^{post}$ from $\underline{\theta}_n$ to give $$\underline{q}_n \equiv \underline{\theta}_n - \underline{\hat{\theta}}_n^{post} \qquad \text{Equation 10}$$
$$= R_n \underline{b}_n + \underline{w}_n,$$

where $\underline{w}_n = R_n^{post\text{-}ignore}\underline{b}_n^{post\text{-}ignore} + R_n^{post}(\underline{b}_n^{post} - \Pi_n \underline{\hat{b}}_n^{post}) + R_n^{pre\text{-}ignore}\underline{b}_n^{pre\text{-}ignore} + \underline{z}_n$ contains ignored ISI, any residual error after post-cursor ISI cancellation, and unmodeled additive interference. At this point, it is convenient to give an alternative formulation of the weights in $\Pi_n$ in which the same weight is used for all symbols; the value of such a $\Pi_n$, that minimizes the square error between $\underline{\theta}_n$ and $\underline{\hat{\theta}}_n^{post}$ is $\Pi_n = \pi_n I$, where $\pi_n = (\underline{\hat{\theta}}_n^{post})^H \underline{\theta}_n / \|\underline{\hat{\theta}}_n^{post}\|^2$ and I is the identity matrix.

Figure 6C:
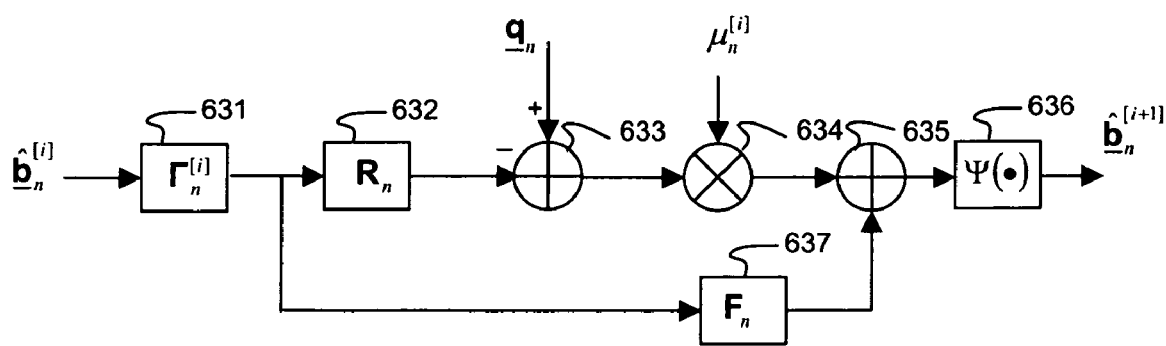
FIG. 6c is a flow diagram illustrating an interference-cancellation method in accordance with an alternative embodiment of the invention.

FIG. 6c shows an embodiment of the invention configured for performing functionality described with respect to the ICUs 402.1-402.P shown in FIG. 4. This functionality is also described in TCOMM-0047. The input symbol decisions are scaled by a soft-weighting matrix 631, and the scaled symbols are coupled into two parallel branches. The first branch forms an error vector by subtracting 633 a synthesized version of $\underline{q}_n$ (generated by multiplying 632 the symbol estimates by the matrix $R_n$) from the measured $\underline{q}_n$, and then scales 634 this error vector with a stabilizing step size. The second branch multiplies 637 the weighted symbols by an implementation matrix $F_n$ (which is either an identity matrix or a transmit-signal correlation matrix over multiple symbol intervals,) and adds 635 the result to the scaled error vector. Finally, symbol decisions 636 are made on each element using any symbol-estimation technique, including the mixed-decision technique described in TCOMM-0047, to produce updated symbol decisions. The functionality of FIG. 6c may be expressed by the one-step matrix-update equation $$\underline{\hat{b}}_n^{[i+1]} = \Psi(\mu_n^{[i]}(\underline{q}_n - R_n \Gamma_n^{[i]} \underline{\hat{b}}_n^{[i]}) + F_n \Gamma_n^{[i]} \underline{\hat{b}}_n^{[i]}). \qquad \text{Equation 11}$$

Those skilled in the art will recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. An interference canceller for cancelling inter-symbol interference (ISI), intra-cell interference, and inter-cell interference in a multiple-access communication signal, comprising:
a post-cursor ISI synthesis module configured for synthesizing an estimated post-cursor ISI signal from post-cursor symbol estimates;
a post-cursor ISI cancellation module and a resolving module configured for processing the estimated post-cursor ISI signal and the received signal to produce a first interference-canceled signal;
an interference cancellation module configured for cancelling pre-cursor inter-symbol interference, intra-cell interference, and inter-cell interference from the first interference-cancelled signal for producing interference-cancelled symbol estimates and the post-cursor symbol estimates; and
a feedback loop configured for coupling the post-cursor symbol estimates to the post-cursor ISI synthesis module,
whereby the post-cursor ISI synthesis module is further configured to receive as input a plurality of symbol estimates in a predetermined number of post-cursor symbol intervals, the post-cursor ISI synthesis module comprising:
a weighting module configured for weighting the plurality of symbol estimates according to symbol-estimate merits to produce weighted symbol estimates;
a code-waveform modulator configured for modulating the weighted symbol estimates onto corresponding code waveforms for producing modulated code waveforms and summing the modulated code waveforms to generate an estimated transmit signal; and
a channel emulator configured for imparting multipath delays and gains to the estimated transmit signal.

2. The interference canceller recited in claim 1, whereby the interference cancellation module is configured to subtract a synthesized post-cursor inter-symbol interference signal from the received signal to cancel post-cursor inter-symbol interference in the received signal.

3. The interference canceller recited in claim 1, whereby each of the symbol-estimated merits comprises a function of average ratio of signal power to interference-plus-noise power of a corresponding symbol estimate.

4. The interference canceller recited in claim 3, whereby the average ratio of signal power to interference-plus-noise power is estimated from a pilot signal.

5. The interference canceller recited in claim 3, whereby the average ratio of signal power to interference-plus-noise power is estimated using techniques of statistical signal processing.

6. The interference canceller recited in claim 1, whereby the function of the average ratio of signal power to interference-plus-noise power is characterized by $$\pi = \max\left\{C, \frac{1}{1 + 1/SINR}\right\},$$

where $\pi$ is a symbol weight, max { } is a function for selecting a maximum value from a set of quantities within brackets { }, SINR denotes an averages ratio of signal power to interference-plus-noise power (SINR) of the symbol, and C is a non-negative real constant for enforcing a minimum symbol weight.

7. The interference canceller recited in claim 1, whereby the weighting module is further configured to assign all symbols a common weight.

8. The interference canceller recited in claim 7, whereby the weighting module is further configured to choose the weight to minimize mean square-error between the received signal and a synthesized signal.

9. The interference canceller recited in claim 8, whereby the weighting module is further configured to choose the weight according to $$\pi_n = (\theta_n^{post})^H \theta_n / \|\theta_n^{post}\|^2,$$

where $\pi_n$ is the weight, $\underline{\theta}_n$ is a vector having multi-symbol elements produced from Rake processing with combining, $\underline{\theta}_n^{post}$ is a vector having multi-symbol outputs after despreading, H denotes a complex-conjugate transpose, and $\|\bullet\|^2$ denotes a sum of an argument's elements' magnitude squares.

10. An interference canceller for cancelling inter-symbol interference (ISI), intra-cell interference, and inter-cell interference in a multiple-access communication signal, comprising:
a post-cursor ISI synthesis module configured for synthesizing an estimated post-cursor ISI signal from post-cursor symbol estimates;
a post-cursor ISI cancellation module and a resolving module configured for processing the estimated post-cursor ISI signal and the received signal to produce a first interference-canceled signal;
an interference cancellation module configured for cancelling pre-cursor inter-symbol interference, intra-cell interference, and inter-cell interference from the first interference-cancelled signal for producing interference-cancelled symbol estimates and the post-cursor symbol estimates; and
a feedback loop configured for coupling the post-cursor symbol estimates to the post-cursor ISI synthesis module, whereby the interference cancellation module comprises,
a symbol-estimation module configured for generating initial symbol estimates;
a sequence of interference cancellation units, the sequence configured to receive the initial symbol estimates, each of the sequence of interference cancellation units configured to weight input symbol estimates with soft weighting, apply stabilizing step sizes to a difference signal, and perform mixed decisions to produce updated, interference-cancelled symbol estimates; and
a partitioning module configured to output final updated, interference-cancelled symbol estimates for an on-cursor symbol interval.

11. The interference canceller recited in claim 10, whereby the partitioning module is further configured to output temporary symbol estimates corresponding to a predetermined number of post-cursor symbol intervals.

12. The interference canceller recited in claim 10, whereby the symbol-estimation module is further configured to employ temporary symbol estimates for a predetermined number of post-cursor symbol intervals for generating the initial symbol estimates.

13. An interference canceller for cancelling inter-symbol interference (ISI), intra-cell interference, and inter-cell interference in a multiple-access communication signal, comprising:
a post-cursor ISI synthesis module configured for synthesizing an estimated post-cursor ISI signal from post-cursor symbol estimates;
a post-cursor ISI cancellation module and a resolving module configured for processing the estimated post-cursor ISI signal and the received signal to produce a first interference-canceled signal;
an interference cancellation module configured for cancelling pre-cursor inter-symbol interference, intra-cell interference, and inter-cell interference from the first interference-cancelled signal for producing interference-cancelled symbol estimates and the post-cursor symbol estimates; and
a feedback loop configured for coupling the post-cursor symbol estimates to the post-cursor ISI synthesis module,
whereby the interference cancellation module is further configured for performing iterative pre-cursor ISI cancellation at the symbol level by employing a one-step matrix update equation, comprising an explicit matrix representation of a received-signal correlation matrix over multiple symbol intervals, an implementation matrix over multiple symbol intervals, a soft-weighting matrix, a scalar stabilizing step size, and a mixed decision symbol estimator.

14. The interference canceller recited in claim 13, whereby the matrix update equation is expressed by $$\hat{\underline{b}}_n^{(i+1)} = \Psi\left(\mu_n^{[i]}\left(\underline{q}_n - R_n \Gamma_n^{[i]} \hat{\underline{b}}_n^{[i]}\right) + F_n \Gamma_n^{[i]} \hat{\underline{b}}_n^{[i]}\right),$$

wherein $\hat{\underline{b}}_n^{[i]}$ is a column vector containing input symbols decisions of sources of precursor symbols for symbol intervals after an $i^{th}$ iteration of interference cancellation, $\underline{q}_n$ is a vector of a resolved received signal over a plurality of post-cursor symbol intervals, $\mu_n^{[i]}$ is a scalar stabilizing step, $\Gamma_n^{[i]}$ is a weighting matrix used for scaling the input symbol decisions, $R_n$ is the received-signal correlation matrix over the plurality of post-cursor symbol intervals, $F_n$ is an implementation matrix, $\Psi$ is a mixed-decision operator that returns mixed symbol decisions to produce the updated symbol decisions $\hat{\underline{b}}_n^{[i+1]}$.

15. A method whereby inter-symbol interference (ISI), intra-cell interference, and inter-cell interference in a multiple-access communication signal are cancelled, the method comprising:
providing for synthesizing an estimated post-cursor ISI signal from post-cursor symbol estimates;
providing for processing the estimated post-cursor ISI signal and the received signal to produce a first interference-canceled signal in which post-cursor ISI has been removed from the received signal;
providing for performing interference cancellation for cancelling pre-cursor inter-symbol interference, intra-cell interference, and inter-cell interference from the first interference-cancelled signal for producing interference-cancelled symbol estimates and the post-cursor symbol estimates; and
providing for feeding back the post-cursor symbol estimates to the step of providing for synthesizing an estimated post-cursor ISI signal,
whereby providing for synthesizing is further configured to receive as input a plurality of symbol estimates in a predetermined number of post-cursor symbol intervals, providing for synthesizing comprising:
providing for weighting the plurality of symbol estimates according to symbol-estimate merits to produce weighted symbol estimates;
providing for modulating the weighted symbol estimates onto corresponding code waveforms for producing modulated code waveforms and summing the modulated code waveforms to generate an estimated transmit signal;
and providing for performing channel emulation to impart multipath delays and gains to the estimated transmit signal.

16. The method recited in claim 15, whereby providing for performing interference cancellation further comprises subtracting a synthesized post-cursor inter-symbol interference signal from the received signal to cancel post-cursor inter-symbol interference in the received signal.

17. The method recited in claim 15, whereby each of the symbol-estimate merits comprises a function of average ratio of signal power to interference-plus-noise power of a corresponding symbol estimate.

18. The method recited in claim 17, whereby providing for performing interference cancellation further comprises estimating the average ratio of signal power to interference-plus-noise power from a pilot signal.

19. The method recited in claim 17, whereby providing for performing interference cancellation further comprises using techniques of statistical signal processing for estimating the average ratio of signal power to interference-plus-noise power.

20. The method recited in claim 15, whereby the function of the average ratio of signal power to interference-plus-noise power is characterized by $$\pi = \max\left\{C, \frac{1}{1 + 1/SINR}\right\},$$

where π is a symbol weight, max { } is a function for selecting a maximum value from a set of quantities within brackets { }, SINR denotes an average ratio of signal power to interference-plus-noise power (SINR) of the symbol, and C is a non-negative real constant for enforcing a minimum symbol weight.

21. The method recited in claim 15, whereby providing for weighting further comprises assigning all symbols a common weight.

22. The method recited in claim 21, whereby providing for weighting further comprises choosing the weight to minimize mean square-error between the received signal and at least one synthesized signal.

23. The method recited in claim 22, whereby providing for weighting further comprises choosing the weight as $$\pi_n = (\theta_n^{post})^H \theta_n / \|\theta_n^{post}\|^2,$$

where $\pi_n$ is the weight, $\underline{\theta}_n$ is a vector having multi-symbol elements produced from Rake processing with combining, $\underline{\theta}_n^{post}$ is a vector having multi-symbol outputs after despreading, H denotes complex-conjugate transpose, and $\|\bullet\|^2$ denotes a sum of an argument's elements' magnitude squares.

24. A method whereby inter-symbol interference (ISI), intra-cell interference, and inter-cell interference in a multiple-access communication signal are cancelled, the method comprising:
    providing for synthesizing an estimated post-cursor ISI signal from post-cursor symbol estimates;
    providing for processing the estimated post-cursor ISI signal and the received signal to produce a first interference-canceled signal in which post-cursor ISI has been removed from the received signal;
    providing for performing interference cancellation for cancelling pre-cursor inter-symbol interference, intra-cell interference, and inter-cell interference from the first interference-cancelled signal for producing interference-cancelled symbol estimates and the post-cursor symbol estimates; and
    providing for feeding back the post-cursor symbol estimates to the step of providing for synthesizing an estimated post-cursor ISI signal,
    whereby providing for performing interference cancellation comprises,
        providing for generating initial symbol estimates;
        providing for a sequence of interference cancellation steps, the sequence configured to receive the initial symbol estimates, each of the sequence of interference cancellation steps configured to weight input symbol estimates with soft weighting, apply stabilizing step sizes to s difference signal, and perform mixed decisions to produce updated, interference-cancelled symbol estimates; and
        providing for outputting final updated, interference-cancelled symbol estimates for an on-cursor symbol interval.

25. The method recited in claim 24, whereby providing for outputting further comprises outputting temporary symbol estimates corresponding to a predetermined number of post-cursor symbol intervals.

26. The method recited in claim 24, whereby providing for generating initial symbol estimates is further configured to employ temporary symbol estimates for a predetermined number of post-cursor symbol intervals for generating the initial symbol estimates.

27. A method whereby inter-symbol interference (ISI), intra-cell interference, and inter-cell interference in a multiple-access communication signal are cancelled, the method comprising:
    providing for synthesizing an estimated post-cursor ISI signal from post-cursor symbol estimates;
    providing for processing the estimated post-cursor ISI signal and the received signal to produce a first interference-canceled signal in which post-cursor ISI has been removed from the received signal;
    providing for performing interference cancellation for cancelling pre-cursor inter-symbol interference, intra-cell interference, and inter-cell interference from the first interference-cancelled signal for producing interference-cancelled symbol estimates and the post-cursor symbol estimates; and
    providing for feeding back the post-cursor symbol estimates to the step of providing for synthesizing an estimated post-cursor ISI signal,
    whereby providing for performing interference cancellation is further configured for performing iterative pre-cursor ISI cancellation at the symbol level by employing a one-step matrix update equation, comprising an explicit matrix representation of a received-signal correlation matrix over multiple symbol intervals, an implementation matrix over multiple symbol intervals, a soft-weighting matrix, a scalar stabilizing step size, and a mixed decision symbol estimator.

28. The method recited in claim 27, whereby the matrix update equation is expressed by $$\hat{\underline{b}}_n^{(i+1)} = \Psi\left(\mu_n^{[i]}\left(\underline{q}_n - R_n \Gamma_n^{[i]} \hat{\underline{b}}_n^{[i]}\right) + F_n \Gamma_n^{[i]} \hat{\underline{b}}_n^{[i]}\right),$$

wherein $\hat{\underline{b}}_n^{[i]}$ is a column vector containing input symbols decisions of sources of precursor symbols for symbol intervals after an $i^{th}$ iteration of interference cancellation, $\underline{q}_n$ is a vector of a resolved received signal over a plurality of post-cursor symbol intervals, $\mu_n^{[i]}$ is a scalar stabilizing step, $\Gamma_n^{[i]}$ is a weighting matrix used for scaling the input symbol decisions, $R_n$ is the received-signal correlation matrix over the plurality of post-cursor symbol intervals, $F_n$ is an implementation matrix, $\Psi$ is a mixed-decision operator that returns mixed symbol decisions to produce the updated symbol decisions $\hat{\underline{b}}_n^{[i+1]}$.

29. A system whereby inter-symbol interference (ISI), intra-cell interference, and inter-cell interference in a multiple-access communication signal are cancelled, the system comprising:
    a post-cursor ISI synthesis means for synthesizing as estimated post-cursor ISI signal from post-cursor symbol estimates;
    a post cursor ISI cancellation means and a resolving means for processing the estimated post-cursor ISI signal and the received signal to produce a first interference-canceled signal;
    an interference cancellation means for cancelling pre-cursor inter-symbol interference, intra-cell interference, and inter-cell interference from the first interference-cancelled signal for producing interference-cancelled symbol estimates and the post-cursor symbol estimates; and a feedback means for coupling the post-cursor symbols estimates to the post-cursor ISI synthesis means, whereby the post-cursor ISI synthesis means is configured to receive as input a plurality of symbols estimates in a predetermined number of post-cursor symbol intervals, the post-cursor ISI synthesis means comprising:

a weighting means for weighting the plurality of symbol estimates according to symbol-estimates merits to produce weighted symbol estimates;

a code-waveform modulation means for modulation the weighted symbol estimates onto corresponding code waveforms for producing modulated code waveforms and summing the modulated code waveforms to generate an estimated transmit signal; and a channel-emulation means for imparting multipath delays and gains to the estimated transmit signal.

30. The system recited in claim 29, whereby the interference cancellation means is further configured to subtract a synthesized post-cursor inter-symbol interference signal from the received signal to cancel post-cursor inter-symbol interference in the received signal.

31. The system recited in claim 29, whereby each of the symbol-estimate merits comprises a function of average ratio of signal power to interference-plus-noise power of a corresponding symbol estimate.

32. The system recited in claim 31, whereby the average ratio of signal power to interference-plus-noise power is estimated from a pilot signal.

33. The system recited in claim 31, whereby the average ratio of signal power to interference-plus-noise power is estimated using techniques of statistical signal processing.

34. The system recited in claim 29, whereby the function of the average ratio of signal power to interference-plus-noise power is characterized by $$\pi = \max\left\{C, \frac{1}{1+1/SINR}\right\},$$

where $\pi$ is a symbol weight, max { } is a function for selecting a maximum value from a set of quantities within brackets { }, SINR denotes an average ratio of signal power to interference-plus-noise power (SINR) of the symbol, and C is a non-negative real constant for enforcing a minimum symbol weight.

35. The system recited in claim 29, whereby the weighting means is further configured to assign all symbols a common weight.

36. The system recited in claim 35 whereby the weighting means is further configured to choose the weight to minimize mean square-error between the received signal and at least one synthesized signal.

37. The system recited in claim 36, whereby the weighting means is further configured to choose the weight according to $$\pi_n = (\theta_n^{post})^H \theta_n / \|\theta_n^{post}\|^2,$$

where $\pi_n$ is the weight, $\theta_n$ is a vector having multi-symbol elements produced from Rake processing with combining $\theta_n^{post}$ is a vector having multi-symbol outputs after dispreading, H denotes complex-conjugate transpose, and $\|\cdot\|^2$ denotes a sum of an argument's elements' magnitude squares.

38. A system whereby inter-symbol interference (ISI), intra-cell interference, and inter-cell interference in a multiple-access communication signal are cancelled, the system comprising:

a post-cursor ISI synthesis means for synthesizing as estimated post-cursor ISI signal from post-cursor symbol estimates;

a post cursor ISI cancellation means and a resolving means for processing the estimated post-cursor ISI signal and the received signal to produce a first interference-canceled signal;

an interference cancellation means for cancelling pre-cursor inter-symbol interference, intra-cell interference, and inter-cell interference from the first interference-cancelled signal for producing interference-cancelled symbol estimates and the post-cursor symbol estimates; and a feedback means for coupling the post-cursor symbols estimates to the post-cursor ISI synthesis means, whereby the interference cancellation means comprises, a symbol-estimation means for generating initial symbol estimates;

a sequential interference cancellation means for receiving the initial symbol estimates, the sequential interference cancellation means configured to weight input symbol estimates with soft weighting, apply stabilizing step sizes to a difference signal, and perform mixed decisions to produce updated, interference-cancelled symbol estimates; and a partitioning means configured for outputting final updated, interference-cancelled symbol estimates for an on-cursor symbol interval.

39. The system recited in claim 38, whereby the partitioning means is further configured to output temporary symbol estimates corresponding to a predetermined number of post-cursor symbol intervals.

40. The system recited in claim 38, whereby the symbol-estimation means is further configured to employ temporary symbol estimates for a predetermined number of post-cursor symbol intervals for generating the initial symbol estimates.

41. A system whereby inter-symbol interference (ISI), intra-cell interference, and inter-cell interference in a multiple-access communication signal are cancelled, the system comprising:

a post-cursor ISI synthesis means for synthesizing as estimated post-cursor ISI signal from post-cursor symbol estimates;

a post cursor ISI cancellation means and a resolving means for processing the estimated post-cursor ISI signal and the received signal to produce a first interference-canceled signal;

an interference cancellation means for cancelling pre-cursor inter-symbol interference, intra-cell interference, and inter-cell interference from the first interference-cancelled signal for producing interference-cancelled symbol estimates and the post-cursor symbol estimates; and a feedback means for coupling the post-cursor symbols estimates to the post-cursor ISI synthesis means, whereby the interference cancellation means is further configured for performing iterative pre-cursor ISI cancellation at symbol level by employing a one-step matrix update equation, comprising an explicit matrix representation of a received-signal correlation matrix over multiple symbol intervals, an implementation matrix over multiple symbol intervals, a soft-weighting matrix, a scalar stabilizing step size, and a mixed symbol estimator.

42. The system recited in claim 41, whereby the matrix update equation is expressed by $$\hat{\underline{b}}_n^{(i+1)} = \Psi\left(\mu_n^{[i]}\left(\underline{q}_n - R_n \Gamma_n^{[i]} \hat{\underline{b}}_n^{[i]}\right) + F_n \Gamma_n^{[i]} \hat{\underline{b}}_n^{[i]}\right),$$

where $\hat{\underline{b}}_n^{[i]}$ is a column vector containing input symbol decisions of sources of pre-cursor symbols for symbol intervals after an $i^{th}$ iteration of interference cancellation, $\underline{q}_n$ is a vector of a resolved received signal over a plurality of post-cursor symbol intervals, $\mu_n^{[i]}$ is a scalar stabilizing step, $\Gamma_n^{[i]}$ is a weighting matrix used for scaling the input symbol decisions, $R_n$ is the received-signal correlation matrix over the plurality of post-cursor symbol intervals, $F_n$ is an implementation matrix, $\Psi$ is a mixed-decision operator that returns mixed symbol decisions to produce the updated symbol decisions $\underline{b}_n^{[i+1]}$.

* * * * *